United States Patent
Raphael et al.

(10) Patent No.: US 11,178,186 B2
(45) Date of Patent: Nov. 16, 2021

(54) POLICY RULE ENFORCEMENT DECISION EVALUATION WITH CONFLICT RESOLUTION

(71) Applicant: International Business Machines Corporation, Armonk, NY (US)

(72) Inventors: Roger C. Raphael, San Jose, CA (US); Rajesh M. Desai, San Jose, CA (US); Ety Khaitzin, Petah Tikva (IL); Shalu Agrawal, San Jose, CA (US); Angineh Aghakiant, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/824,466

(22) Filed: Mar. 19, 2020

(65) Prior Publication Data

US 2021/0297451 A1    Sep. 23, 2021

(51) Int. Cl.
| | |
|---|---|
| *H04W 12/67* | (2021.01) |
| *H04W 12/72* | (2021.01) |
| *H04L 29/06* | (2006.01) |
| *H04L 12/813* | (2013.01) |
| *H04L 12/24* | (2006.01) |

(52) U.S. Cl.
CPC .......... *H04L 63/20* (2013.01); *H04L 41/0893* (2013.01); *H04L 47/20* (2013.01); *H04L 63/108* (2013.01)

(58) Field of Classification Search
CPC ....... H04L 63/20; H04L 63/108; H04L 47/20; H04L 41/0893
See application file for complete search history.

(56) References Cited

U.S. PATENT DOCUMENTS

| | | | |
|---|---|---|---|
| 7,620,659 B2 | 11/2009 | Novik et al. | |
| 8,489,474 B2 | 7/2013 | Crook et al. | |
| 9,813,420 B2 | 11/2017 | Basso et al. | |
| 10,425,238 B2 | 9/2019 | Poh et al. | |
| 2003/0220966 A1 | 11/2003 | Hepper et al. | |
| 2008/0162452 A1* | 7/2008 | Cox ............... | H04L 41/0893 |

(Continued)

FOREIGN PATENT DOCUMENTS

| | | |
|---|---|---|
| CN | 102946382 A | 2/2013 |
| WO | 2019163514 A1 | 8/2019 |

OTHER PUBLICATIONS

Mell et al., "The NIST Definition of Cloud Computing," National Institute of Standards and Technology, U.S. Department of Commerce, NIST Special Publication 800-145, Sep. 2011, 7 pages.

*Primary Examiner* — Nicholas R Taylor
*Assistant Examiner* — Sanjoy Roy
(74) *Attorney, Agent, or Firm* — Yee & Associates, P.C.

(57) ABSTRACT

A method, apparatus, system, and computer program product for evaluating enforcement decisions on an asset using a policy. Rules in the policy are applied by a computer system to the asset taking into account a context for a request to access the asset in response receiving to the request to access the asset, and wherein the rules in the policy determine whether access to the asset is allowed. A determination is made by the computer system as to whether a conflict is present in an initial decision made using the rules in the policy. A set of conflict resolution processes are applied by the computer system when the conflict is present such that a final decision is made on the request to access the asset.

18 Claims, 10 Drawing Sheets

(56) References Cited

U.S. PATENT DOCUMENTS

| | | | |
|---|---|---|---|
| 2009/0138960 A1* | 5/2009 | Felty | G06N 5/025 726/14 |
| 2009/0240645 A1* | 9/2009 | Cowham | G06N 5/025 706/48 |
| 2010/0070311 A1 | 3/2010 | Heydon et al. | |
| 2012/0054163 A1* | 3/2012 | Liu | H04L 41/0893 707/694 |
| 2017/0317840 A1* | 11/2017 | Poh | H04W 4/24 |
| 2018/0182052 A1* | 6/2018 | Panagos | G06F 21/604 |
| 2021/0119970 A1* | 4/2021 | Raphael | H04L 63/0263 |

\* cited by examiner

POLICY RULE ENFORCEMENT DECISION EVALUATION WITH CONFLICT RESOLUTION

BACKGROUND

1. Field

The disclosure relates generally to an improved computer system and, more specifically, to a method, apparatus, system, and computer program product for enforcement decisions evaluations on assets using rules policies.

2. Description of the Related Art

Organizations such as companies and government agencies have large computer systems. A computer system for an organization can include one or more of the Internet, an intranet, a local area network (LAN), a metropolitan area network (MAN), a wide area network (WAN), a cloud computing environment, or other suitable networks. The computer system for an organization can have a multitude of policies containing rules that are applied to the computer system. The rules in these policies can be based on institutional guidelines, security standards, privacy laws, government regulations, or other sources. Further, some organizations can have very large bodies of data that need to be governed and managed using the policies.

Event logging systems and audit mechanisms can be used to determine whether policies are being followed. Additionally, active mechanisms such as malware scanners, active directories, firewalls, routers, access control lists, and other mechanisms can be used to actively enforce policies in a computer system.

A computer system for an organization may have hundreds or thousands of active policies for enforcement. Further, policies can be added, removed, modified, or some combination thereof. Enforcing policies in a computer system can be resource intensive.

SUMMARY

According to one embodiment of the present invention, a method evaluates a request to access an asset using a policy. Rules in the policy are applied by a computer system to the asset taking into account a context for the request to access the asset in response receiving to the request to access the asset, wherein the rules in the policy determine whether access to the asset is allowed. A determination is made by the computer system as to whether a conflict is present in an initial decision made using the rules in the policy. A set of conflict resolution processes are applied by the computer system when the conflict is present such that a final decision is made on the request to access the asset.

According to another embodiment of the present invention a policy enforcement system comprises a computer system that applies rules in a policy to an asset taking into account a context for a request to access the asset in response receiving to the request to access the asset. The rules in the policy determine whether access to the asset is allowed. The computer system determines whether a conflict is present in an initial decision made using the rules in the policy. The computer system applies a set of conflict resolution processes when the conflict is present such that a final decision is made on the request to access the asset.

According to yet another embodiment of the present invention, a computer program product for evaluating asset using a policy. The computer program product comprises a computer-readable-storage media with first program code, second program code, and third program code stored on the computer-readable storage media. The first is executable by a computer system to cause the computer system to apply rules in the policy to the asset taking into account a context for a request to access the asset in response receiving to the request to access the asset, wherein the rules in the policy determine whether access to the asset is allowed. The second program code is executable by a computer system to cause the computer system to determine whether a conflict is present in an initial decision made using the rules in the policy. The third program code is executable by a computer system to cause the computer system to apply a set of conflict resolution processes when the conflict is present such that a final decision is made on the request to access the asset.

DETAILED DESCRIPTION

Figure 1:
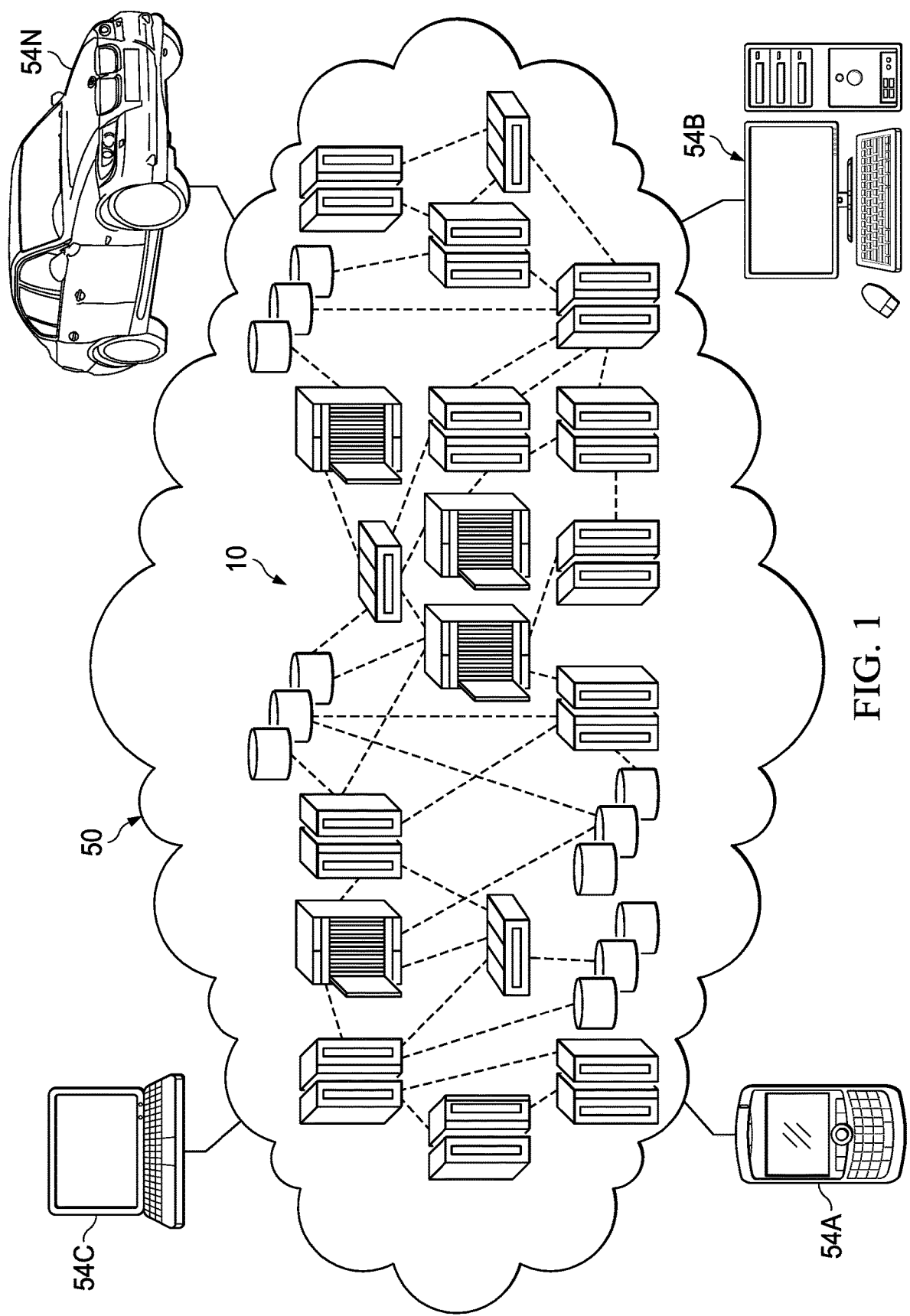
FIG. 1 depicts a cloud computing environment in accordance with an illustrative embodiment.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, an illustration of cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Cloud computing nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 1 are intended to be illustrative only and that cloud computing nodes 10 and cloud computing environment 50 can communicate with any type of computerized device over any type of network and/or network addressable connection (e.g., using a web browser).

Figure 2:
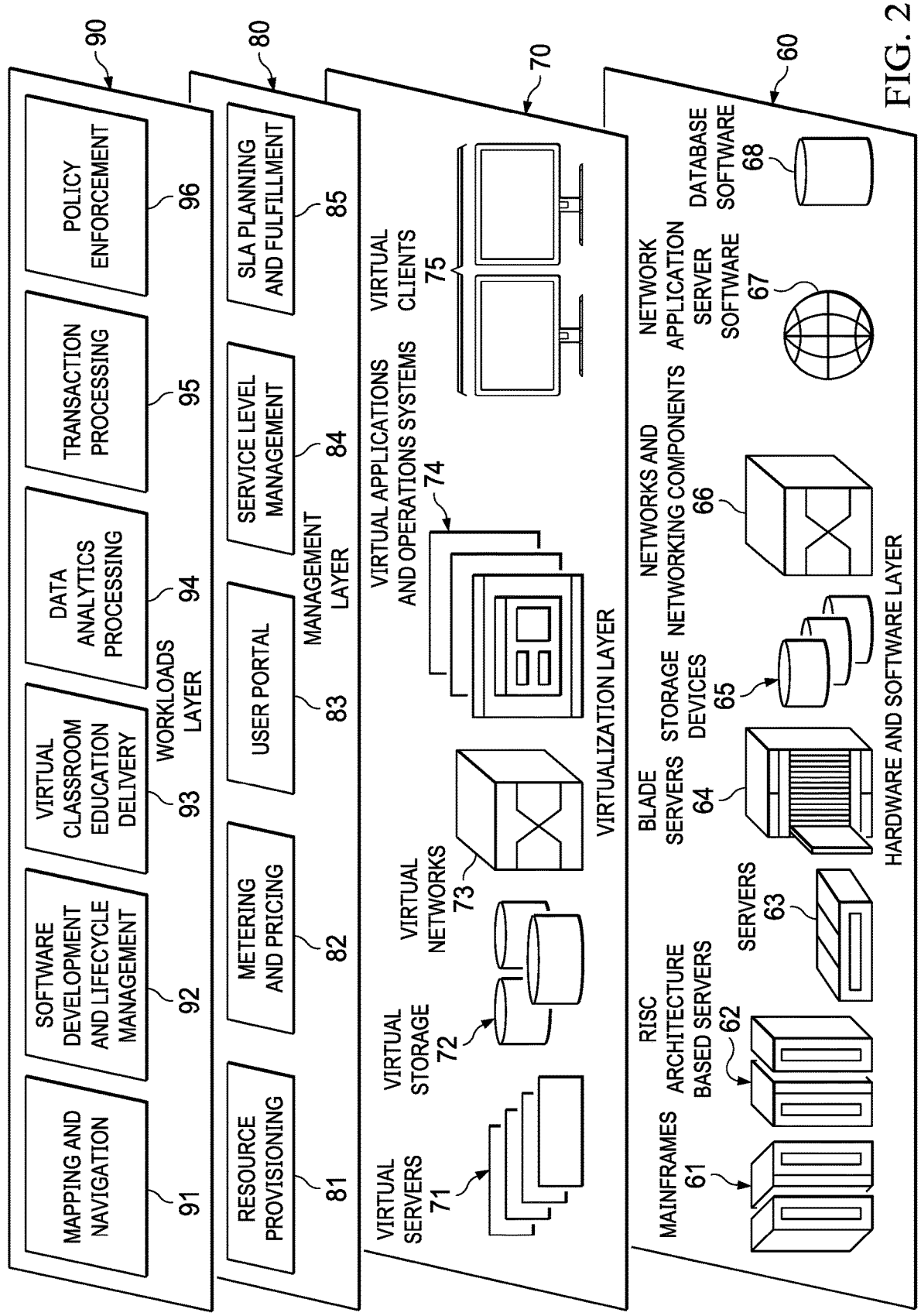
FIG. 2 depicts a set of functional abstraction layers in accordance with an illustrative embodiment.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and policy enforcement 96. Policy enforcement 96 provides a service for applying policies to data assets that are located in cloud computing environment 50 in FIG. 1.

The illustrative embodiments recognize and take into account a number of different considerations. For example, the illustrative embodiments recognize and take into account that, in an environment in which many policies are present, these policies may use different conventions. The conventions can be, for example, allow, deny, or a more complex scheme such as a partial allow with the transformation of selected information.

In the illustrative example, a convention is the way or manner in which a rule is applied. For example, an allow convention allows all access unless a rule denies the access. As another example, a deny convention denies access unless a rule allows the access. In the illustrative example, a partial allow allows access after transformation of selected information. A rule can result in access being denied when the rule is applied after the transformation has been performed.

Illustrative embodiments recognize and take into account that an environment can have policies in which different policies have different conventions. Further, mixed mode policies can be present in which a mixture of rules can include of actions, such as allow, deny, and a partial allow with transformation, can lead decisions for actions that are conflicting. The illustrative embodiments recognize and take into account that with multiple types of actions, two or more rules may apply to a request to access and asset. These rules may result in conflicting actions. For example, a first rule that applies may grant access to the asset while a second rule which also applies denies access to the asset. As a result, a conflict occurs in the application of the rules in the policy.

Thus, the illustrative embodiments provide a method, apparatus, system, and computer program product for resolving conflicts when a policy is present in which mixed actions are present between the rules in the policy. This type of policy is referred to as a mixed mode policy. In one illustrative example, enforcement decision evaluation can be performed on asset using rules in the policy are applied to the asset in which the application rules take into account a context for a request to access the asset in response to receiving the request to access the asset, and wherein the rules in the policy determine whether access to the asset is allowed. Enforcement decision evaluation is an evaluation whether to permit access to an asset. The decision as to whether to allow access is an enforcement decision in this illustrative example. A determination is made as to whether a conflict is present in an initial decision made using the rules in the policy. A set of conflict resolution processes can be used to resolve the conflict when the conflict is present such that a final decision is made on the request to access the asset.

As used herein, a "set of," when used with reference to items, means one or more items. For example, the "set of conflict resolution processes" is one or more conflict resolution processes.

Figure 3:
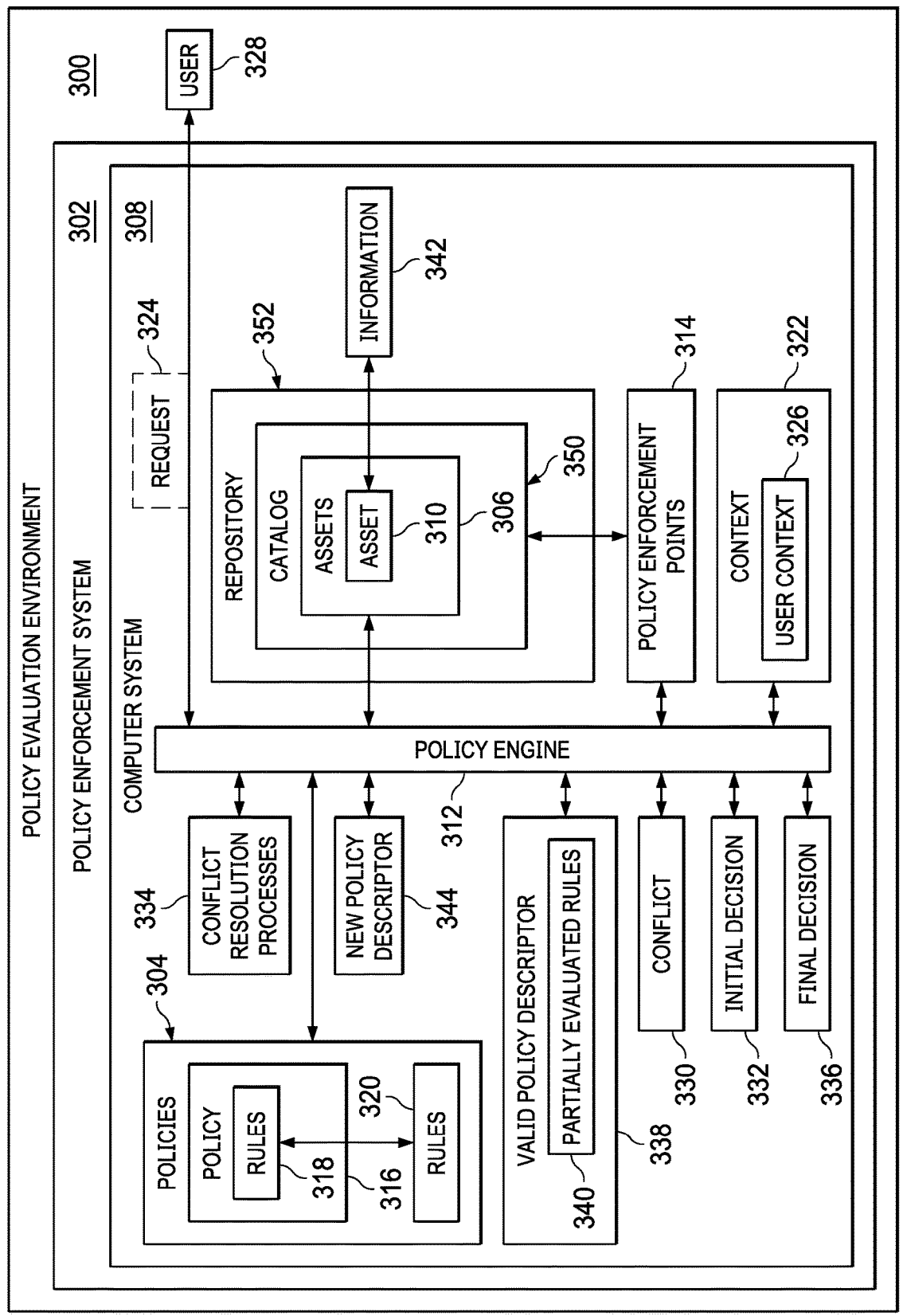
FIG. 3 is a block diagram of a policy evaluation environment in accordance with an illustrative embodiment.

With reference now to FIG. 3, a block diagram of a policy evaluation environment is depicted in accordance with an illustrative embodiment. In this illustrative example, policy evaluation environment 300 is an environment in which policy enforcement system 302 uses policies 304 to evaluate assets 306 in computer system 308. In this illustrative example, policy enforcement system 302 can be used to implement policy enforcement 96 in workloads layer 90 in FIG. 2 for cloud computing environment 50 in FIG. 1.

Computer system 308 is a physical hardware system and includes one or more data processing systems. When more than one data processing system is present in computer system 308, those data processing systems are in communication with each other using a communications medium. The communications medium can be a network. The data processing systems can be selected from at least one of a computer, a server computer, a tablet computer, or some other suitable data processing system.

In this illustrative example, assets 306 is information and can include at least one of user-defined information, system-generated information, metadata about an information asset, a pointer to actual data stored in a database or a file system, or other suitable types of information. In this illustrative example, assets 306 comprise at least one of data or metadata describing the data. For example, asset 310 in assets 306 is a grouping of a number of data sets and related metadata about the number of data sets. A data set is a collection of related sets of information that is composed of separate elements.

As depicted, assets 306 can be stored in repository 352. As depicted, repository 352 takes the form of a catalog. In other illustrative examples, repository 352 can take other forms such as a data lake, a data warehouse, or some other suitable system for organizing and storing data.

For example, asset 310 can comprise or include a data set in the form of a customer table in a database. Asset 310 also can be located in catalog 350 that points to the customer table with a name "X Product Customer Data". This catalog can also contain metadata selected from at least one of a tag associated with asset 310, a type of data present in a column of the customer table, or other suitable information describing the table in asset 310. In other illustrative examples, asset 310 can be a database, a collection of files, or other suitable information.

In this illustrative example, policy enforcement system 302 comprises policy engine 312 in computer system 308. Policy enforcement system 302 can optionally include a number of policy enforcement points 314 in computer system 308. For example, the number of policy enforcement points 314 can be assigned to one or more of assets 306.

At least one of policy engine 312 or the number of policy enforcement points 314 can be implemented in software, hardware, firmware, or a combination thereof. When software is used, the operations performed by at least one of policy engine 312 or a number of policy enforcement points 314 can be implemented in program code configured to run on hardware, such as a processor unit. When firmware is used, the operations performed by at least one of policy engine 312 or the number of policy enforcement points 314 can be implemented in program code and data and stored in persistent memory to run on a processor unit. When hardware is employed, the hardware may include circuits that operate to perform the operations in at least one of policy engine 312 or the number of policy enforcement points 314.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

As used herein, a "number of," when used with reference to items, means one or more items. For example, a "number of different types of networks" is one or more different types of networks.

In this illustrative example, computer system 308 with policy engine 312 enforces organizational policies on asset 310 in assets 306 with policy 316 in policies 304. As depicted, policy engine 312 identifies rules 318 in the active ones of policies 304 in computer system 308. In this example, a policy that is to be applied is an active policy. For example, policy 316 is an active policy. Other policies can be present in policies 304 that are not to be applied. These policies may be policies that have not been completed, not yet been approved, disabled, or some other particular reason.

As depicted, policy 316 is a grouping of rules 318 in rules 320 for policies 304. Rules 318 is a subset of rules 320. Rules 318 in policy 316 can have a convention selected from at least one of an allow everything author deny, a deny everything author allow, or a partial allow with a transform of selected information using cumulative action components of the rules.

As depicted, policy engine 312 in computer system 308 can apply rules 318 in policy 316 to asset 310 taking into account context 322 for request 324 to access the asset in response receiving to request 324 to access asset 310. In this illustrative example, request 324 is received from user 328. In this example, policy 316 is the active policy which is to be applied to asset 310. In other illustrative examples, more than one active policy can be present in policies 304. Rules from those active policies are applied to asset 310 in evaluating requests to access asset 310.

In one illustrative example, a policy enforcement point in policy enforcement points 314 can be implemented in catalog 350. With this implementation, request 324 can be received by catalog 350. Catalog 350 calls the policy enforcement point. The policy enforcement point can then call policy engine 312 to apply rules 318 to asset 310 in catalog 350. In this case, policy engine 312 indirectly receives request 324.

Rules 318 in policy 316 determine whether access to asset 310 is allowed. In this illustrative example, the determination of whether access to asset 310 is allowed can be performed using rules 318 in policy 316, context 322, and asset 310. In the instance in which more than one policy is applied, rules 320 from the applicable policy in policies 304 are used.

In this illustrative example, context 322 is user context 326. Context 322 for request 324 can include a user identification of user 328 making request 324. Further, context 322 can also include a connection context. In this example, the connection context is information about a connection to computer system 308. This connection can be, for example, a connection of a user device, an output device, or some other device in which data from asset 306 may flow. For example, the context information can include at least one of a physical location of the connection, a default location, a connection type, or other suitable information that provides context to the connection.

As depicted, policy engine 312 determines whether conflict 330 is present in initial decision 332 made using rules 318 in policy 316. In other words, policy 316 is a collection of rules 318.

Additionally, policy engine 312 applies a set of conflict resolution processes 334 when conflict 330 is present such that final decision 336 is made on request 324 to access asset 310. In this illustrative example, access can be granted to asset 310 based on initial decision 332 when conflict 330 is absent between rules 318.

In the illustrative example, conflict 330 can be present when two or more of rules 318 in policy 316 are applicable for evaluating whether to permit access to asset 310. The application of these rules can result in different actions.

For example, when thousands of rules are present in rules 318 for policy 316, 30 rules may apply for use in evaluating whether to allow access to asset 310. These 30 rules may have different action blocks within the rules as to what action is performed when the rules are applied. For example, of the 30 rules, 14 rules can have an action that allows access, ten rules can have an action that denies access, and six rules can have actions that are a partial allow in which data is transformed. All of these actions are referred to as cumulative actions. In this example, some of the rules clearly allow access to asset 310, other rules clearly deny access to asset 310, while yet other rules perform a transformation of information in asset 310. The set of conflict resolution processes 334 can be used to resolve these conflicting actions in the 30 rules that are applicable in policy 316.

As depicted, the set of conflict resolution processes 334 can take a number of different forms. For example, the set of conflict resolution processes 334 is selected from at least one of a rule rank model, a risk model, a convention model, or other types of conflict resolution processes.

In one illustrative example, rules 318 can be applied in a partially evaluated form. For example, in applying rules 318 to asset 310, policy engine 312 can identify valid policy descriptor 338 for asset 310. In this illustrative example, valid policy descriptors 338 have been partially evaluated for asset 310 in particular and is not for use with other assets. In this illustrative example, valid policy descriptor 338 comprises partially evaluated rules 340 that are evaluated using information 342 about asset 310. A policy descriptor is a valid policy descriptor when changes have not occurred that affect the application of the partially evaluated rules. For example, valid policy descriptor 338 is valid when asset 310 is not changed and rules 318 have not changed since the partial evaluation of rules 318. In this example, policy engine 312 evaluates request 324 using valid policy descriptor 338.

If the policy descriptor is not valid, policy engine 312 can build new policy descriptor 344. For example, policy engine 312 can build new policy descriptor 344 when at least one of asset 310 or a number of rules 318 in policy 316 have changed. In this case, new policy descriptor 344 is valid policy descriptor 338 for use in determining whether to allow access to asset 310.

As depicted, information about assets 306 can be stored in catalog 350. Catalog 350 can be a table, a database, a container, or some other data structure that stores and organizes metadata for assets 306. In other words, catalog 350 can be used to identify metadata that describes a particular asset in assets 306.

In one illustrative example, one or more solutions are present that overcome a problem with conflicts in the application of rules to assets in policies that have rules using multiple conventions. As a result, one or more technical solutions may provide a conflict resolution mechanism that is applied when a conflict occurs in evaluating an asset using rules in a policy. In this manner, an ability is present resolve conflicts in rules occurring during the application of the rules to assets.

Computer system 308 can be configured to resolve apply rules in policies to assets and resolve conflicts between rules that are applied to the assets in the different illustrative examples using software, hardware, firmware, or a combination thereof to apply rules to an asset and resolve conflicts in the application rules that have mixed actions such as allow, deny, and transform in which conflicts can occur between rules that are applied. As a result, computer system 308 operates as a special purpose computer system in which policy engine 312 in computer system 308 enables resolving conflicts when a policy contains rule using multiple conventions. In particular, policy engine 312 transforms computer system 308 into a special purpose computer system as compared to currently available general computer systems that do not have policy engine 312.

In the illustrative example, the use of policy engine 312 in computer system 308 integrates processes into a practical application for a method of evaluating an asset using rules in a policy that increase the performance of computer system 308. In other words, policy engine 312 in computer system 308 is directed to a practical application of processes integrated into policy engine 312 in computer system 308 that applies rules in the policy to the asset taking into account a context for a request to access the asset in response to receiving the request to access the asset; determines whether a conflict is present in an initial decision made using the rules in the policy; and applies a set of conflict resolution processes when the conflict is present such that a final decision is made on the request to access the asset. In this illustrative example, policy engine 312 in computer system 308 results in processing a request to add service assets using policies. In this manner, policy engine 312 in computer system 308 provides a practical application for evaluating assets using policies such that the functioning of computer system 308 is improved.

The illustration of policy evaluation environment 300 in FIG. 3 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, the set of conflict resolution processes 334 have been described as being selected from a set of conflict resolution processes including at least one of a rule rank model, a risk model, or a convention model. In other examples, other types of conflict resolution processes can be used in addition to or in place of the ones described in this example. For example, additional conflict resolution mechanisms can be used include processes based on human decisions that are integrated in computational decisions. For example, an artificial intelligence system can be used to resolve conflicts. The artificial intelligence system can be trained to perform conflict resolution using at least one of a rule rank model, a risk model, or a convention model. Further, the artificial intelligence system can be trained to perform overrides or final decision making based on training using prior human decisions that were used to resolve conflicts when conflict resolution processes were unable to resolve these conflicts.

As another illustrative example, policy engine 312 can be applied to process one or more policies in policies 304 in addition to or in place of policy 316. In one illustrative example, two active policies can be present with one policy adding five rules and another policy having three rules. In this case, eight rules are present between the two active policies for evaluation when a request is received to access an asset.

Figure 4:
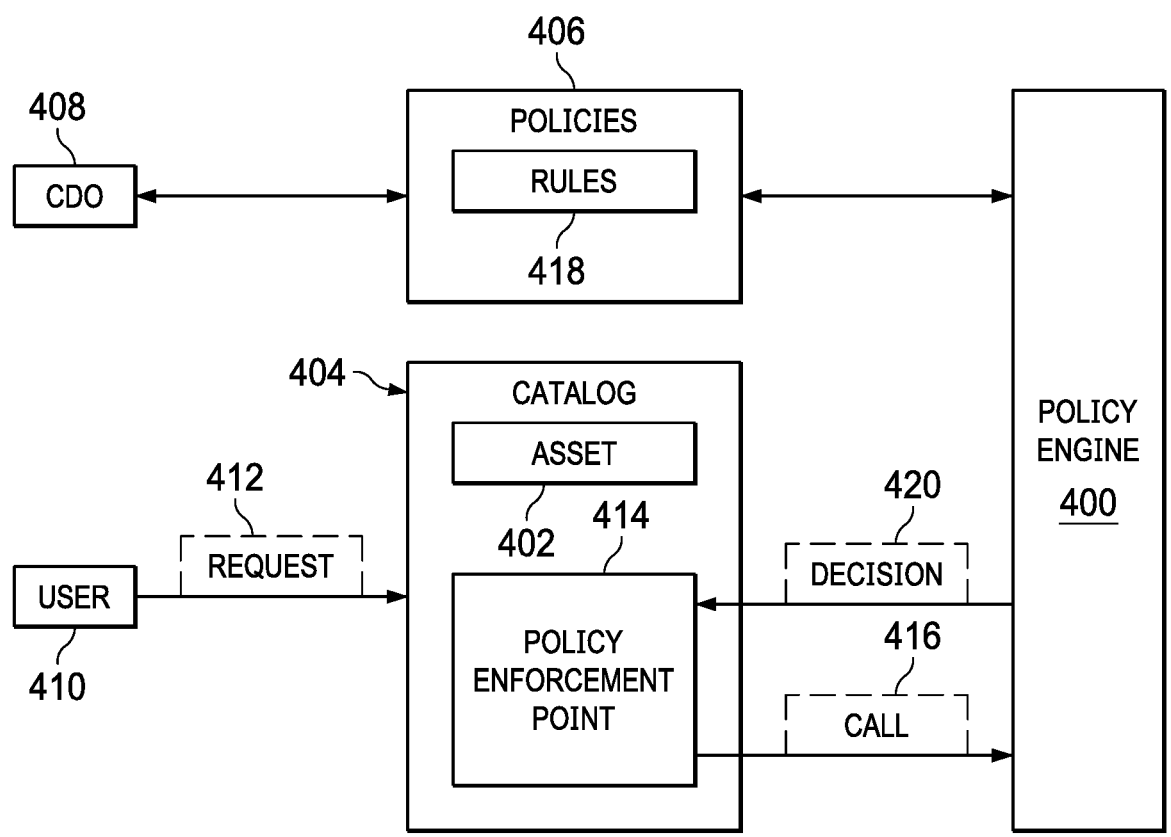
FIG. 4 is an illustration of a data flow in processing a request to access an asset in accordance with an illustrative embodiment.

Turning now to FIG. 4, an illustration of a data flow in processing a request to access an asset is depicted in accordance with an illustrative embodiment. In this illustrative example, policy engine 400 is an example of policy engine 312 in FIG. 3. As depicted, policy engine 400 can evaluate request to access asset 402 in catalog 404. In this illustrative example, the evaluation of a request is made using policies 406. Policies 406 can be authored or selected by chief data officer (CDO) 408 or some other user. For example, CDO 408 can choose a default policy, author a new rule, modify an existing rule, create a new policy, modify an existing policy, or make some other change to policies 406. In this illustrative example, policies 406 are active policies because they are to be used in evaluating request to access asset 402.

In this example, user 410 makes request 412 to access asset 402. Request 412 is made to catalog 404. As depicted, catalog 404 uses policy enforcement point 414 to determine whether access to asset 402 should be granted. Policy enforcement point 414 makes call 416 to policy engine 400. Call 416 is a request to evaluate asset 402 using policies 406 to determine whether to grant user 410 access to asset 402. Call 416 also includes the context for user 410. In this manner, policy engine 400 indirectly receives request 412.

Policy engine 400 determines whether to grant user 410 access to asset 402 using policies 406. This determination includes resolving any conflicts that may be present in rules 418 within policies 406. The result of the valuation is returned to policy enforcement point 414 in decision 420. Policy enforcement point 414 can then allow denial access to asset 402 based on decision 420.

Figure 5:
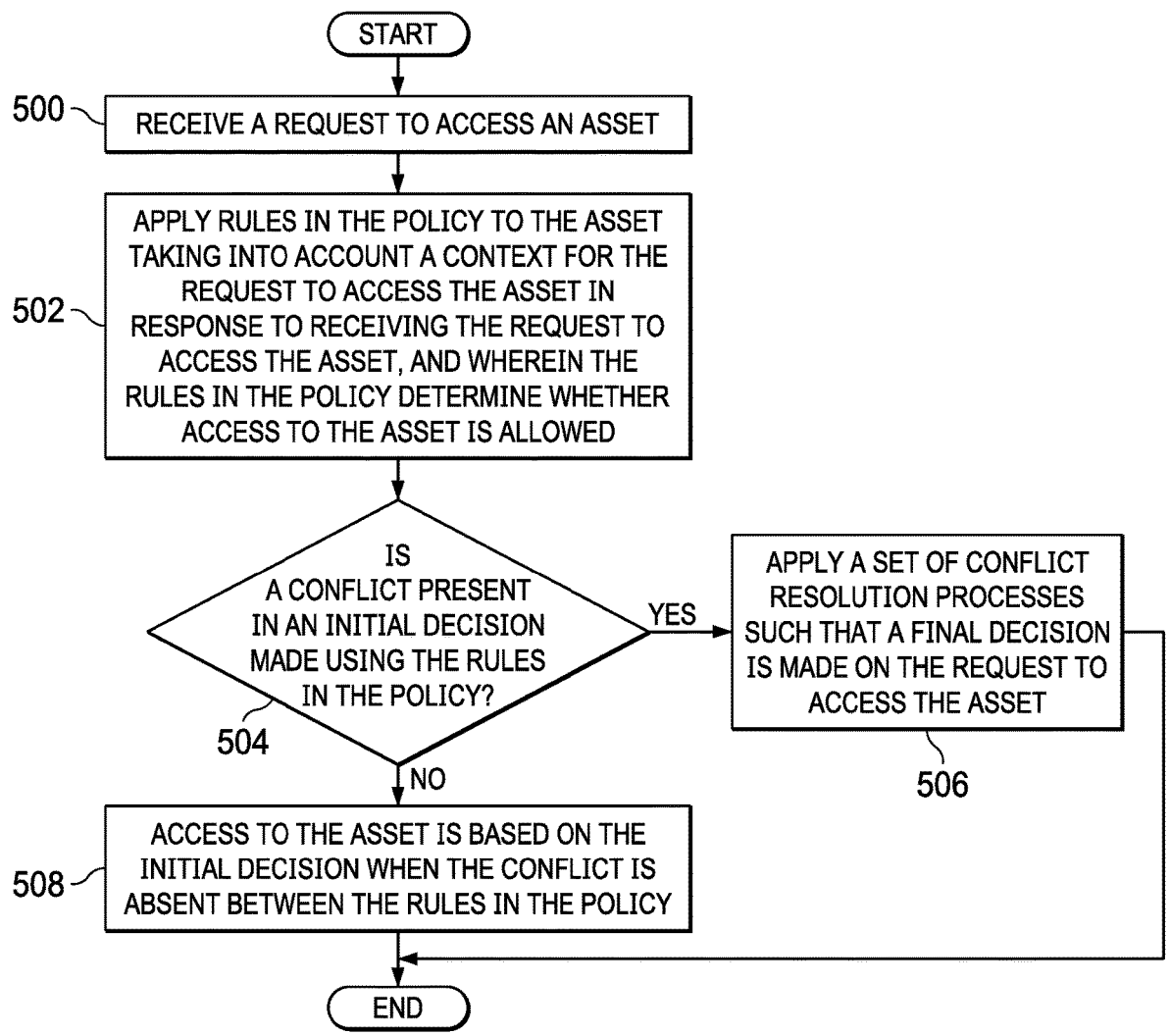
FIG. 5 is a flowchart of a process for evaluating an asset using a policy is depicted in accordance with an illustrative embodiment.

With reference next to FIG. 5, a flowchart of a process for evaluating an asset using a policy is depicted in accordance with an illustrative embodiment. The process in FIG. 5 can be implemented in hardware, software, or both. When implemented in software, the process can take the form of program code that is run by one of more processor units located in one or more hardware devices in one or more computer systems. For example, the process can be implemented in policy engine 312 in computer system 308 in FIG. 3.

The process begins by receiving a request to access an asset (step 500). The process applies rules in the policy to the asset taking into account a context for the request to access the asset in response to receiving the request to access the asset, and wherein the rules in the policy determine whether access to the asset is allowed (step 502). In this illustrative example, the application of the rules can be performed by applying the rules in an evaluated form or by applying a policy descriptor with partially evaluated rules for that asset.

As depicted, when a policy is applied, the policy is an active policy which has been approved and enabled for use in determining whether to grant access to access. Policies in progress, not yet approved, or disabled are policies that are present but not used for determining whether to grant access to asset.

The process determines whether a conflict is present in an initial decision made using the rules in the policy (step 504). If a conflict is present, the process applies a set of conflict resolution processes such that a final decision is made on the request to access the asset (step 506). The process terminates thereafter. In step 506, the set of conflict resolution processes is selected from at least one of a rule rank model, a risk model, a convention model, or some other suitable type of conflict resolution mechanism.

If the conflict is absent, access to the asset is determined based on the initial decision when the conflict is absent between rules in the policy (step 506). In step 508, the decision can be, for example. allowed, denied, or a partial access based on the rules when a conflict is not present. The process terminates thereafter.

Figure 6:
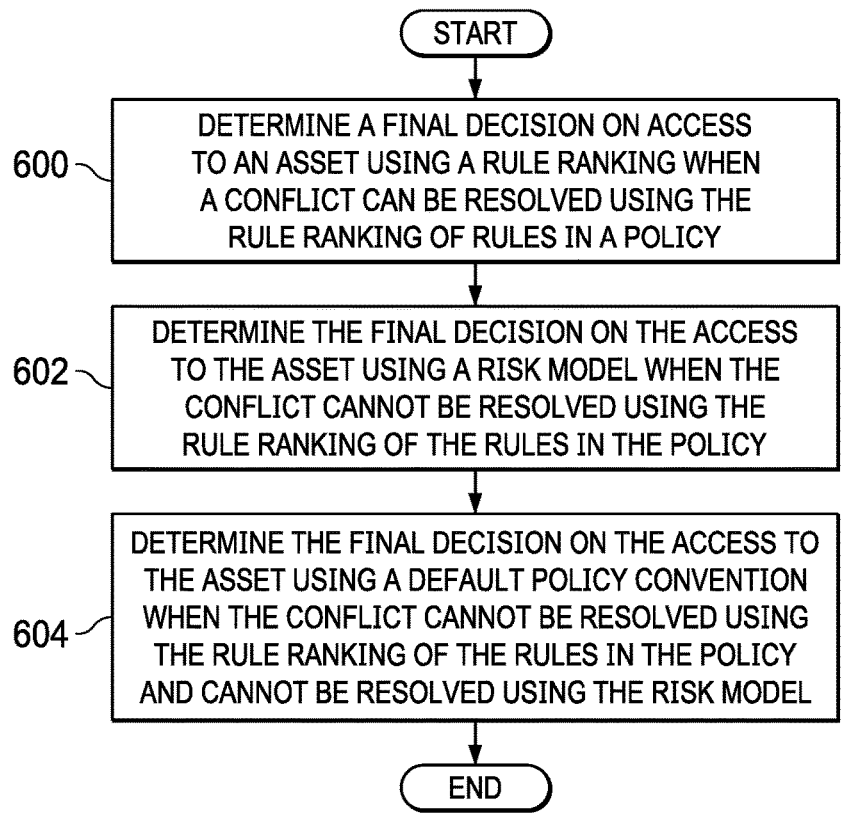
FIG. 6 is a flowchart of a process for applying a set of conflict resolution processes is depicted in accordance with an illustrative embodiment.

Turning next to FIG. 6, a flowchart of a process for applying a set of conflict resolution processes is depicted in accordance with an illustrative embodiment. The process illustrated in FIG. 6 is an example of one manner in which step 506 in FIG. 5 can be applied.

The process begins by determining the final decision on the access to the asset using a rule ranking when the conflict can be resolved using the rule ranking of the rules in the policy (step 600). The conflict resolution process used in step 600 is a rank model. The process determines the final decision on the access to the asset using a risk model when the conflict cannot be resolved using the rule ranking of the rules in the policy (step 602). The conflict resolution process used in step 602 is a risk model.

A determination is made as to whether the ranking of the rules is able to resolve the conflict (step 1006). In step 1006, the rules are applied in the order based on the ranking as part of a rank model. The rules resolve the conflict if a single decision can be made using highest level rule that is applied to the asset. In the illustrative, the asset that has sensitive personal data.

The process determines the final decision on the access to the asset using a default policy convention when the conflict cannot be resolved using the rule ranking of the rules in the policy and cannot be resolved using the risk model (step 604). The process terminates thereafter. The default policy convention can be allow or deny in this example. Access is denied if the default policy convention is deny and the conflict cannot be resolved. The access is allowed if the default policy convention is allow and the conflict cannot be resolved. The conflict resolution process in step 604 is a convention model in this example.

Figure 7:
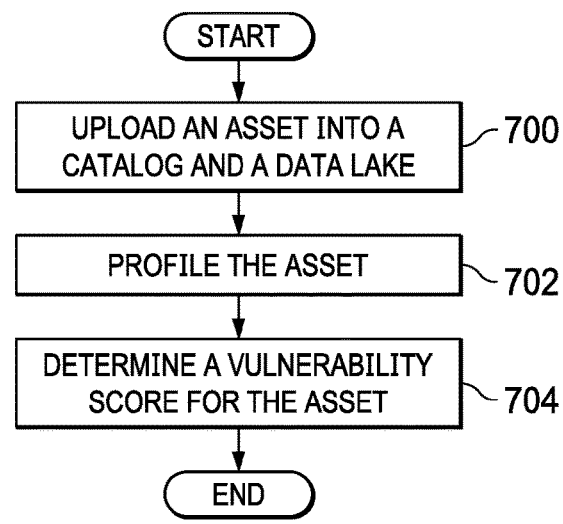
FIG. 7 is a flowchart of a process for adding an asset in accordance with an illustrative embodiment.

Turning now to FIG. 7, a flowchart of a process adding an asset is depicted in accordance with an illustrative embodiment. The process in FIG. 7 can be implemented in hardware, software, or both. When implemented in software, the process can take the form of program code that is run by one or more processor units located in one or more hardware devices in one or more computer systems. For example, the process can be implemented in policy engine 312 in computer system 308 in FIG. 3.

The process begins by uploading an asset into a catalog and a data lake (step 700). In step 700, the asset is uploaded by storing the asset in the data lake and storing metadata for the asset in the catalog. The metadata describes the asset and can be used for applying rules in policies. The process then profiles the asset (step 702). In profiling the asset, the process determines what type of data is present.

The process determines a vulnerability score for the asset (step 704). The process terminates thereafter. The vulnerability score indicates the level of sensitivity or confidentiality for particular types of information in the asset. For example, the types of information can include dates, names, addresses, salaries, job titles, and other information. Each of these types of information have a weight with respect to vulnerability. For example, a salary can have a higher weighing than a job title. In one illustrative example, a policy descriptor predicate can be encoded to compute a vulnerability score and check that vulnerability score against a threshold as an additional conjunctive in the predicates in the policy descriptor.

Further, the vulnerability score can change for different transformations that may be applied to the asset. A set of vulnerability scores can be computed based on possible transformations or on applicable transformations. As another example, the same asset will have a lower vulnerability score after a transformation of the asset that removes salary from the asset.

Figure 8:
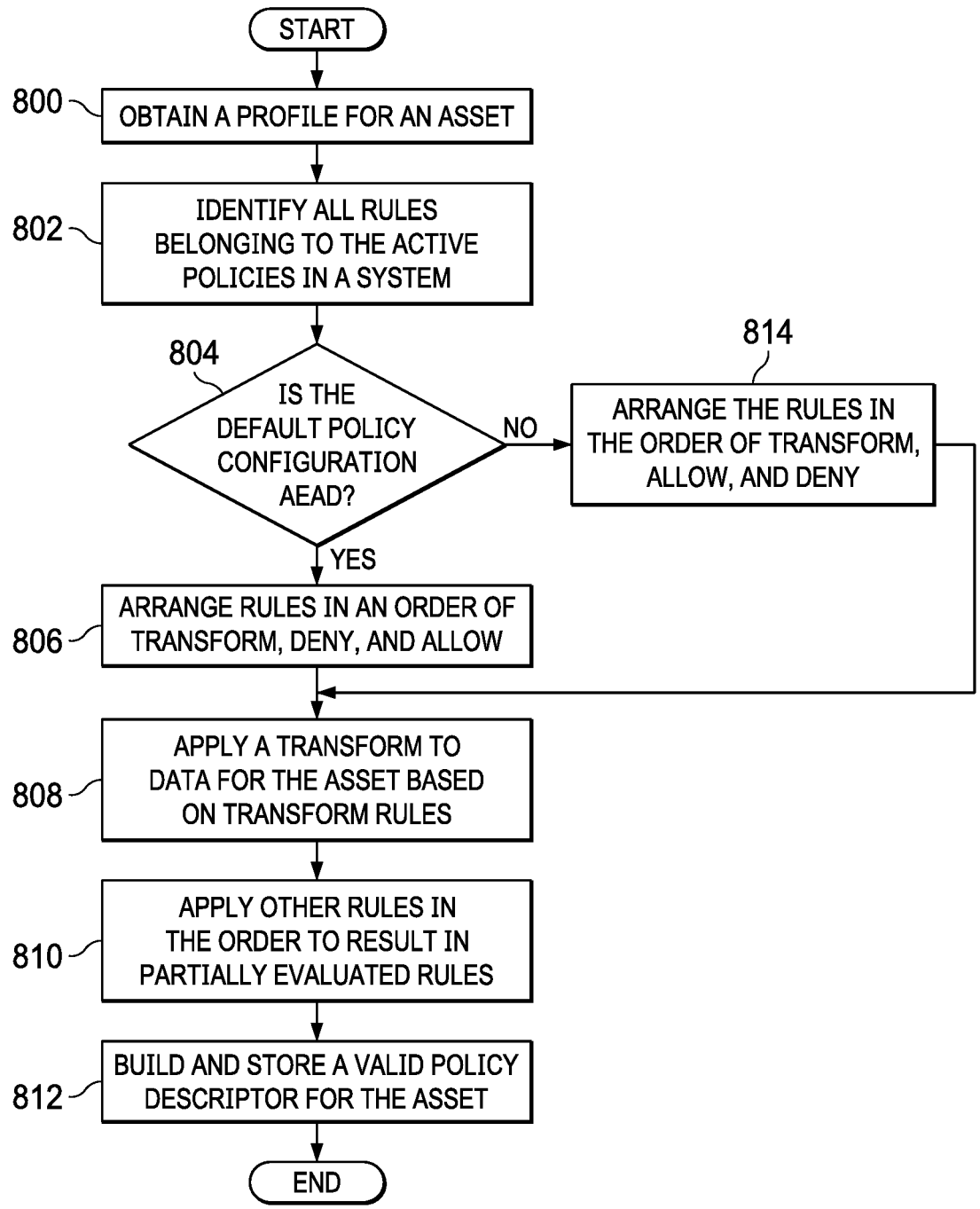
FIG. 8 is a flowchart of a process for building a valid policy descriptor in accordance with an illustrative embodiment.

With reference to FIG. 8, a flowchart of a process for building a valid policy descriptor is depicted in accordance with an illustrative embodiment. The process in FIG. 8 can be implemented in hardware, software, or both. When implemented in software, the process can take the form of program code that is run by one of more processor units located in one or more hardware devices in one or more computer systems. For example, the process can be implemented in policy engine 312 in computer system 308 in FIG. 3.

The process begins by obtaining a profile for an asset (step 800). The process identifies all rules belonging to the active policies in a system (step 802). In this illustrative example, the system can be at an organization or an on-premise deployment at tenant as a software as a service (SaaS) cloud deployment.

The process determines whether a default policy convention configuration is AEAD (step 804). In step 804, AEAD is allow everything an author deny. This type of policy configuration defaults to allowing access unless the rule denies access.

If the policy convention configuration choice is AEAD, the process arranges rules in an order of transform, deny, and allow (step 806). In other words, the rules are placed into the order in which transform rules are first, deny rules are second, and allow rules are third.

The process applies a transform to data for the asset based on transform rules that evaluated is true (step 808). Transform rules that are evaluated. If the transform rules evaluate to true, then the action part of the rules describes the transforms are needed to be applied to the data in an asset. For example, financial information about a person may be allowed only by a financial department or group and the information may be transformed to remove some of the information.

The process then applies other rules in the order to result in partially evaluated rules (step 810). The process then builds and stores a valid policy descriptor for the asset (step 812). The process terminates thereafter. The valid policy descriptor comprises the partially evaluated rules and a policy identifier. The valid policy descriptor can also include a timestamp indicating when the valid policy descriptor was generated.

With reference again to step 804, if the default policy configuration is not AEAD, the process arranges the rules in the order of transform, allow, and deny (step 814). The process then proceeds to step 808 as described above.

Figure 9:
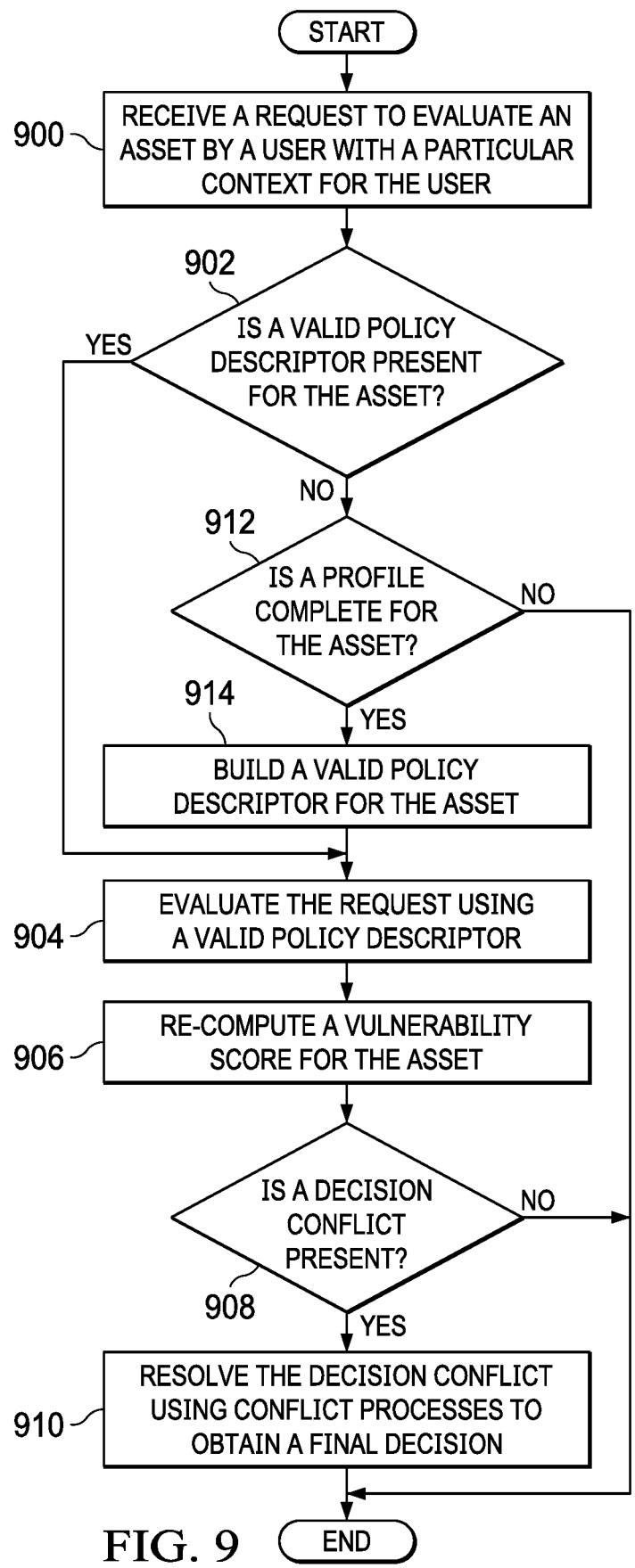
FIG. 9 is a flowchart of a process for evaluating an asset using rules in a policy in accordance with an illustrative embodiment.

Turning to FIG. 9, a flowchart of a process for evaluating an asset using rules in a policy is depicted in accordance with an illustrative embodiment. The process in FIG. 9 can be implemented in hardware, software, or both. When implemented in software, the process can take the form of program code that is run by one or more processor units located in one or more hardware devices in one or more computer systems. For example, the process can be implemented in policy engine 312 in computer system 308 in FIG. 3.

The process begins by receiving a request to evaluate an asset by a user with a particular context for the user (step 900). The process determines whether a valid policy descriptor is present for the asset (step 902). In this illustrative example, a valid policy descriptor is present if the asset has not changed and the rules in the system that are used to build the partially evaluated policy descriptor have not changed. Whether changes have occurred can be determined based on when the policy descriptor was created. A time stamp can be associated with the policy descriptor for this purpose. The time stamp can also be associated with a rule to indicate when the rule was created or changed.

If a valid policy descriptor is present, the process evaluates the request using the valid policy descriptor (step 904). This evaluation includes applying a transformation if needed on the asset. In performing the transformation, information can be hidden, omitted, encoded, redacted, partially redacted, or otherwise changed in a manner that changes the vulnerability score. For example, a phone number may be removed or partially redacted. This change to the phone number can reduce the vulnerability score to indicate a reduced vulnerability of the information in the transformed asset.

The process then re-computes a vulnerability score for the asset based on the transformation of the asset (step 906). In performing the transform, information may be hidden, omitted, encoded, redacted, partially redacted, or otherwise changed in a manner that changes the vulnerability score.

For example, a phone number may be removed or partially redacted. If a conflict is present in the decision, then the vulnerability score is determined at evaluation time and if this score exceeds a threshold, a decision is made accordingly to deny access or to affect a maximum amount of transformation to data as deemed necessary to enable access. The conflicting decision that was obtained initially can be discarded in favor of the vulnerability score decision.

The process then determines if a conflict is present in the decision (step 908).

If the decision is that a conflict is present, the process then resolves the conflict using conflict processes to obtain a final decision (step 910). The process terminates thereafter.

With reference again to step 908, if the decision that a conflict is not present, the process terminates. In this case, the decision indicates whether access should be provided to the asset.

With reference again to step 902, if a valid policy descriptor is not present, a determination is made as to whether the profile is complete for the asset (step 912). If the profile is complete, the process builds a valid policy descriptor for the asset (step 914). Step 914 can be performed using the process in the flowchart in FIG. 8. The process then proceeds to step 904 as described above.

With reference again to step 912, if the profile for the asset is not complete, the process terminates without providing access to the asset. In this case, the asset has not yet been fully processed. The process can be repeated after waiting a period of time to see whether a policy descriptor has been created for the asset.

Figure 10:
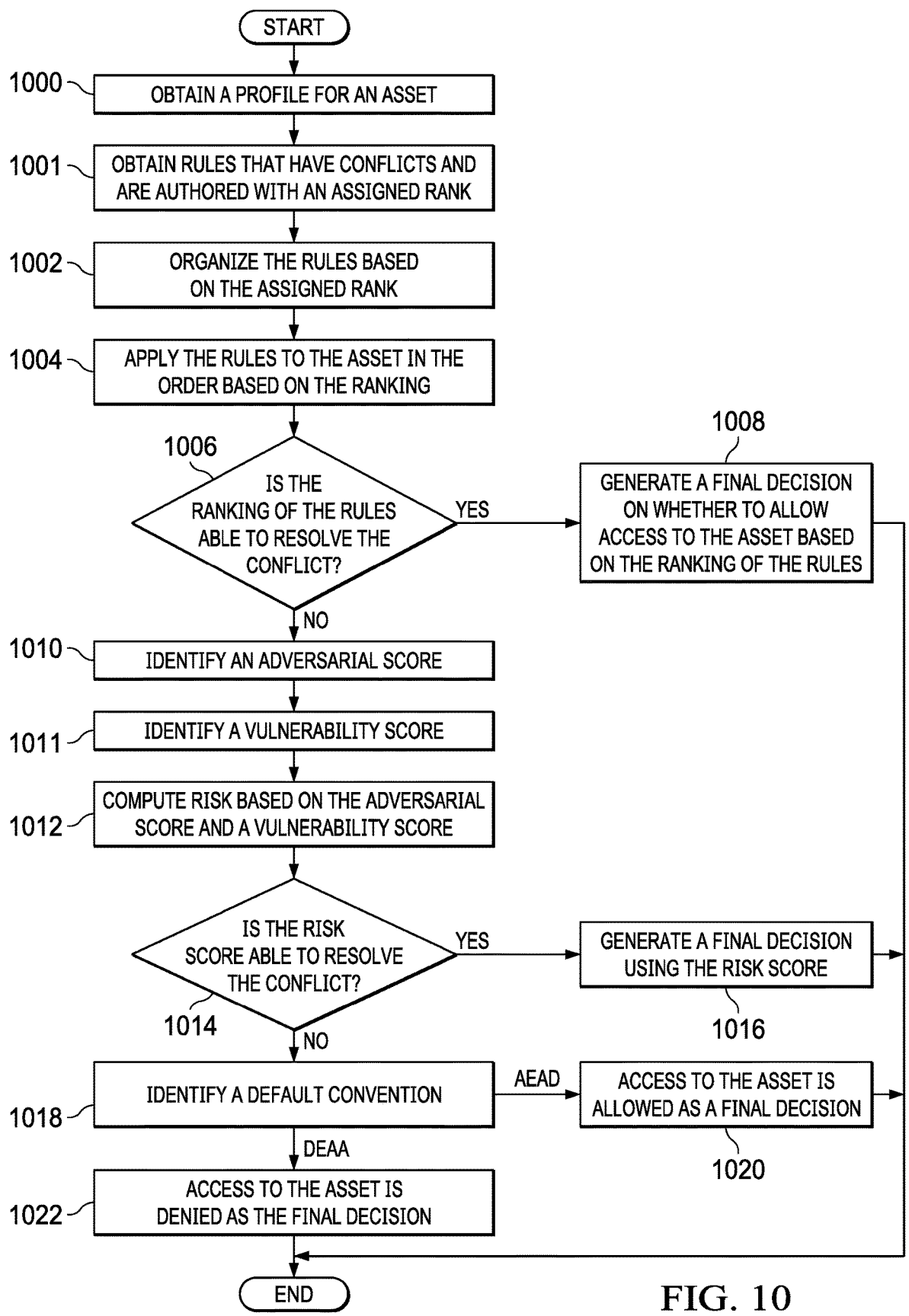
FIG. 10 is a flowchart of a process for resolving a conflict using conflict resolution processes in accordance with an illustrative embodiment.

With reference next to FIG. 10, a flowchart of a process for resolving a conflict using conflict resolution processes is depicted in accordance with an illustrative embodiment. The process in FIG. 10 is an example of one implementation for step 908 in FIG. 9.

The process begins by obtaining a profile for an asset (step 1000). The process obtains rules that have conflicts and are authored with an assigned rank (step 1001). The process then organizes the rules based on the assigned rank (step 1002). The process applies the rules to the asset in the order based on the ranking (step 1004). Thus, the process in the preceding steps takes all of the ranked rules and applies the ranked rules to the asset. If any of these rules provide a decision, the conflict is resolved.

A determination is made as to whether the ranking of the rules is able to resolve the conflict (step 1006). In step 1006, the rules are applied in the order based on the ranking as part of a rank modal. The rules resolve the conflict if a single decision can be made using highest level rule that is applied to the asset. In the illustrative, the asset that has sensitive personal data.

In this example, three rules that are ranked apply to the asset. These rules are Rule rank 10 (highest): if asset has credit cards remove this column (not applied to the asset); Rule rank 9: if asset has sensitive personal data deny access to this asset (applied to this asset-result deny); and Rule rank 5: Allow access to all assets (not applied, because higher rank already applied). In this illustrative example, the rules can resolve the conflict based on using the rule with the highest rank. In another example, some ranked rules may have the same rank such that rule ranking cannot resolve the conflict.

If the ranking of the rules resolves the conflict, the process generates a final decision on whether to allow access to asset based on the ranking of the rules (step 1008). The process terminates thereafter.

With reference again to step 1006, if the ranking of the rules does not resolve the conflict, the process identifies an adversarial score (step 1010). In step 1010, the adversarial score is based on the context of the user request. For example, in the context, the location of the user may be located in a geographic location in which restrictions are present as to what information can be sent. This location can increase the adversarial score as compared to another geographic location in which information is not restricted. As another example, the adversarial score can be higher when the connection is through an unsecured network as compared to being through a virtual private network.

The process identifies a vulnerability score (step 1011). In step 1011, vulnerability score can be dependent on possible transformations to the data. For example, different vulnerability scores for the same asset for different transformations.

The process computes a risk score based on the adversarial score and the vulnerability score (step 1012). In step 1012, a model can be used to determine the risk score. The risk score can be a weighted function of each of the component scores, the adversarial score and the vulnerability score. In illustrative example, a model can implement a weighted function that is determined empirically. As another example, the rescore can be computed from these components using a simple regression models, machine learning model or other suitable techniques.

The process then determines whether the risk score is able to resolve the conflict (step 1014). This determination is part of a risk model. If sufficient information is not present to calculate the adversarial and vulnerability scores, the risk score generated can be unable to resolve the conflict.

For example, if a conflict is present in the decision, the score can be in the risk model to determine whether to grant access to the asset. In example, this risk score is determined before and after a transformation of an asset. For example, with financial data including a salary, the presence of this data increase the vulnerability score used to determine the risk score, If there conflict is present, the context of the user is used to compare vulnerability score, with the risk score, if risk score is below a configurable threshold then access will be denied else allowed.

When a transformation of the asset removes the salary from the data decrease vulnerability score, which in turn reduces the risk score. As a result, the accessibility of the asset increases. In another example, a transformation of the asset that removes health data from the asset reduces the risk score when the user requesting access to the asset if not a physician that is authorized to access the asset.

If the risk score resolves the conflict, the process generates a final decision using the risk score (step 916). The process terminates thereafter.

With reference again to step 914, if the risk score is not able to resolve the conflict, the process identifies a default convention (step 918). If the default convention is allow everything and author deny (AEAD), the access to the asset is allowed as the final decision (step 920). The process terminates thereafter. With reference again the step 918, if the default connection is denied everything an author allowed (DEAA), the access to the asset is denied as the final decision (step 920). These steps are part of a convention model for resolving the conflict and can be used as a default if other conflict resolution processes cannot resolve the conflict. The process terminates thereafter.

FIG. 9 illustrates one example of conflict resolution processes. Other permutations of these processes can be used in other examples. Further, other conflict resolution processes in addition to or in place of the ones depicted in in FIG. 9.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks can be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams can be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession can be performed substantially concurrently, or the blocks may sometimes be performed in the reverse order, depending upon the functionality involved. Also, other blocks can be added in addition to the illustrated blocks in a flowchart or block diagram.

Figure 11:
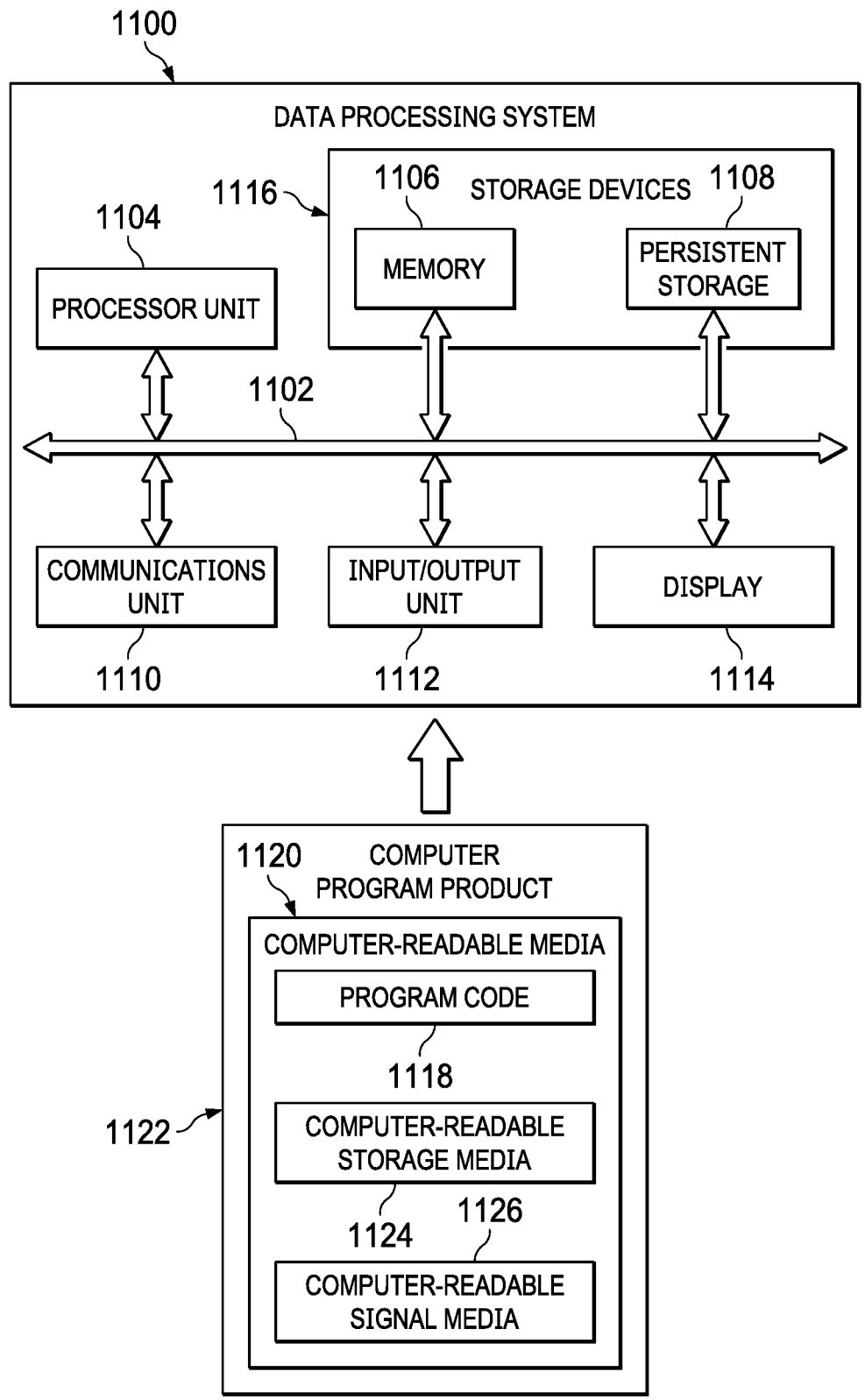
FIG. 11 is a block diagram of a data processing system in accordance with an illustrative embodiment.

Turning now to FIG. 11, a block diagram of a data processing system is depicted in accordance with an illustrative embodiment. Data processing system 1100 can be used to implement cloud computing nodes 10 in FIG. 1 and computer system 308 in FIG. 3. In this illustrative example, data processing system 1100 includes communications framework 1102, which provides communications between processor unit 1104, memory 1106, persistent storage 1108, communications unit 1110, input/output (I/O) unit 1112, and display 1114. In this example, communications framework 1102 takes the form of a bus system.

Processor unit 1104 serves to execute instructions for software that can be loaded into memory 1106. Processor unit 1104 includes one or more processors. For example, processor unit 1104 can be selected from at least one of a multicore processor, a central processing unit (CPU), a graphics processing unit (GPU), a physics processing unit (PPU), a digital signal processor (DSP), a network processor, or some other suitable type of processor. Further, processor unit 1104 can may be implemented using one or more heterogeneous processor systems in which a main processor is present with secondary processors on a single chip. As another illustrative example, processor unit 1104 can be a symmetric multi-processor system containing multiple processors of the same type on a single chip.

Memory 1106 and persistent storage 1108 are examples of storage devices 1116. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1116 may also be referred to as computer-readable storage devices in these illustrative examples. Memory 1106, in these examples, can be, for example, a random-access memory or any other suitable volatile or non-volatile storage device. Persistent storage 1108 may take various forms, depending on the particular implementation.

For example, persistent storage 1108 may contain one or more components or devices. For example, persistent storage 1108 can be a hard drive, a solid-state drive (SSD), a flash memory, a rewritable optical disk, a rewritable magnetic tape, or some combination of the above. The media used by persistent storage 1108 also can be removable. For example, a removable hard drive can be used for persistent storage 1108.

Communications unit 1110, in these illustrative examples, provides for communications with other data processing systems or devices. In these illustrative examples, communications unit 1110 is a network interface card.

Input/output unit 1112 allows for input and output of data with other devices that can be connected to data processing system 1100. For example, input/output unit 1112 may provide a connection for user input through at least one of a keyboard, a mouse, or some other suitable input device. Further, input/output unit 1112 may send output to a printer. Display 1114 provides a mechanism to display information to a user.

Instructions for at least one of the operating system, applications, or programs can be located in storage devices 1116, which are in communication with processor unit 1104 through communications framework 1102. The processes of the different embodiments can be performed by processor unit 1104 using computer-implemented instructions, which may be located in a memory, such as memory 1106.

These instructions are referred to as program code, computer usable program code, or computer-readable program code that can be read and executed by a processor in processor unit 1104. The program code in the different embodiments can be embodied on different physical or computer-readable storage media, such as memory 1106 or persistent storage 1108.

Program code 1118 is located in a functional form on computer-readable media 1120 that is selectively removable and can be loaded onto or transferred to data processing system 1100 for execution by processor unit 1104. Program code 1118 and computer-readable media 1120 form computer program product 1122 in these illustrative examples. In the illustrative example, computer-readable media 1120 is computer-readable storage media 1124.

In these illustrative examples, computer-readable storage media 1124 is a physical or tangible storage device used to store program code 1118 rather than a medium that propagates or transmits program code 1118.

Alternatively, program code 1118 can be transferred to data processing system 1100 using a computer-readable signal media. The computer-readable signal media can be, for example, a propagated data signal containing program code 1118. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer-readable media 1120" can be singular or plural. For example, program code 1118 can be located in computer-readable media 1120 in the form of a single storage device or system. In another example, program code 1118 can be located in computer-readable media 1120 that is distributed in multiple data processing systems. In other words, some instructions in program code 1118 can be located in one data processing system while other instructions in program code 1118 can be located in one data processing system. For example, a portion of program code 1118 can be located in computer-readable media 1120 in a server computer while another portion of program code 1118 can be located in computer-readable media 1120 located in a set of client computers.

The different components illustrated for data processing system 1100 are not meant to provide architectural limitations to the manner in which different embodiments can be implemented. In some illustrative examples, one or more of the components may be incorporated in or otherwise form a portion of, another component. For example, memory 1106, or portions thereof, may be incorporated in processor unit 1104 in some illustrative examples. The different illustrative embodiments can be implemented in a data processing system including components in addition to or in place of those illustrated for data processing system 1100. Other components shown in FIG. 11 can be varied from the illustrative examples shown. The different embodiments can be implemented using any hardware device or system capable of running program code 1118.

Thus, illustrative embodiments of the present invention provide a computer implemented method, computer system, and computer program product for evaluating a request access to an asset using a policy. Rules in the policy are applied by a computer system to the asset taking into account a context for a request to access the asset in response to receiving the request to access the asset, and wherein the rules in the policy determine whether access to the asset is allowed. A determination is made by the computer system as to whether a conflict is present in an initial decision made using the rules in the policy. A set of conflict resolution processes is applied by the computer system when the conflict is present such that a final decision is made on the request to access the asset.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

The descriptions of the various embodiments of the present invention have been presented for purposes of illustration, but are not intended to be exhaustive or limited to the embodiments disclosed. Not all embodiments will include all of the features described in the illustrative examples. Further, different illustrative embodiments may provide different features as compared to other illustrative embodiments. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A method for evaluating a request to access an asset using a policy, the method comprising:
   applying, by a computer system, rules in the policy to the asset taking into account a context for the request to access the asset in response receiving to the request to access the asset, wherein the rules in the policy determine whether access to the asset is allowed;
determining, by the computer system, whether a conflict is present in an initial decision made using the rules in the policy; and
applying, by the computer system, a set of conflict resolution processes when the conflict is present such that a final decision is made on the request to access the asset, wherein applying, by the computer system, the set of conflict resolution processes such that the final decision is made on the request to access the asset comprises:
determining, by the computer system, the final decision on access to the asset using a rule ranking when the conflict can be resolved using the rule ranking of the rules in the policy;
determining, by the computer system, the final decision on access to the asset using a risk model when the conflict cannot be resolved using the rule ranking of the rules in the policy; and
determining, by the computer system, the final decision on access to the asset using a default convention when the conflict cannot be resolved using the rule ranking of the rules in the policy and cannot be resolved using the risk model,
wherein the context comprises at least one of a user context or a connection context.

2. The method of claim 1 further comprising:
granting access based on the initial decision when the conflict is absent between rules in the policy.

3. The method of claim 1, wherein the set of conflict resolution processes is selected from at least one of a rule rank model, a risk model, or a convention model.

4. The method of claim 1, wherein determining, by the computer system, whether the conflict is present between rules in the policy comprises:
identifying, by the computer system, a valid policy descriptor for the asset, wherein the valid policy descriptor comprises partially evaluated rules that are evaluated using information about the asset; and
evaluating, by the computer system, the request using the valid policy descriptor.

5. The method of claim 4 wherein determining, by the computer system, whether the conflict is present between the rules in the policy further comprises:
building, by the computer system, a new policy descriptor when at least one of the asset or a number of the rules in the policy have changed, wherein the new policy descriptor is the valid policy descriptor.

6. The method of claim 1, wherein the rules in the policy have a convention selected from at least one of a deny everything author allow, or a partial allow with a transform of selected information using cumulative action components of the rules.

7. A policy enforcement system comprising:
a computer system that applies rules in a policy to an asset taking into account a context for a request to access the asset in response receiving to the request to access the asset, wherein the rules in the policy determine whether access to the asset is allowed; determines whether a conflict is present in an initial decision made using the rules in the policy; and applies a set of conflict resolution processes when the conflict is present such that a final decision is made on the request to access the asset, wherein in applying the set of conflict resolution processes such that the final decision is made on the request to access the asset, the computer system determines the final decision on access to the asset using a rule ranking when the conflict can be resolved using the rule ranking of the rules in the policy; determines the final decision on access to the asset using a risk model when the conflict cannot be resolved using rule ranking of the rules in the policy; and determines the final decision on access to the asset using a default convention when the conflict cannot be resolved using the rule ranking of the rules in the policy and cannot be resolved using the risk model,
wherein the context comprises at least one of a user context or a connection context.

8. The policy enforcement system of claim 7, wherein the computer system granting access based on the initial decision when the conflict is absent between rules in the policy.

9. The policy enforcement system of claim 7, wherein the set of conflict resolution processes is selected from at least one of a rule rank model, a risk model, or a convention model.

10. The policy enforcement system of claim 7, wherein in determining whether the conflict is present between rules in the policy, the computer system identifies a valid policy descriptor for the asset, wherein the valid policy descriptor comprises partially evaluated rules that are evaluated using information about the asset and evaluates the request using the valid policy descriptor.

11. The policy enforcement system of claim 10, wherein in determining whether the conflict is present between the rules in the policy, the computer system builds a new policy descriptor when at least one of the asset or a number of the rules in the policy have changed, wherein the new policy descriptor is the valid policy descriptor.

12. The policy enforcement system of claim 7, wherein the rules in the policy have a convention selected from at least one of a deny everything author allow, or a partial allow with a transform of selected information using cumulative action components of the rules.

13. A computer program product for evaluating a request to access an asset using a policy, the computer program product comprising:
a computer-readable storage media;
first program code, stored on the computer-readable storage media, executable by a computer system to cause the computer system to apply rules in the policy to the asset taking into account a context for request to access the asset in response receiving to the request to access the asset, wherein the rules in the policy determine whether access to the asset is allowed;
second program code, stored on the computer-readable storage media, executable by a computer system to cause the computer system to determine whether a conflict is present in an initial decision made using the rules in the policy; and
third program code, stored on the computer-readable storage media, executable by a computer system to cause the computer system to apply a set of conflict resolution processes when the conflict is present such that a final decision is made on the request to access the asset wherein the third program code comprises:
program code, stored on the computer-readable storage media, executable by a computer system to cause the computer system to determine the final decision on access to the asset using a rule ranking when the conflict can be resolved using the rule ranking of the rules in the policy;
program code, stored on the computer-readable storage media, executable by a computer system to cause the computer system to determine the final decision on access to the asset using a risk model when the conflict cannot be resolved using the rule ranking of the rules in the policy; and program code, stored on the computer-readable storage media, executable by a computer system to cause the computer system to determine the final decision on access to the asset using a default convention when the conflict cannot be resolved using the rule ranking of the rules in the policy and cannot be resolved using the risk model, wherein the context comprises at least one of a user context or a connection context.

14. The computer program product of claim 13 further comprising:

fourth program code, stored on the computer-readable storage media, executable by a computer system to cause the computer system to granting access based on the initial decision when the conflict is absent between rules in the policy.

15. The computer program product of claim 13, wherein the set of conflict resolution processes is selected from at least one of a rule rank model, a risk model, or a convention model.

16. The computer program product of claim 13, wherein second program code comprises:

program code, stored on the computer-readable storage media, executable by a computer system to cause the computer system to identify a valid policy descriptor for the asset, wherein the valid policy descriptor comprises partially evaluated rules that are evaluated using information about the asset; and program code, stored on the computer-readable storage media, executable by a computer system to cause the computer system to evaluate the request using the valid policy descriptor.

17. The computer program product of claim 16, wherein the second program code further comprising:

program code, stored on the computer-readable storage media, executable by a computer system to cause the computer system to build a new policy descriptor when at least one of the asset or a number of the rules in policy have changed, wherein the new policy descriptor is the valid policy descriptor.

18. The computer program product of claim 13, wherein the rules in the policy have a convention selected from at least one of a deny everything author allow, or a partial allow with a transform of selected information using cumulative action components of the rules.

\* \* \* \* \*